US006648759B2

(12) United States Patent
Vancura

(10) Patent No.: US 6,648,759 B2
(45) **Date of Patent: *Nov. 18, 2003**

(54) GAMING MACHINES WITH BONUSING

(75) Inventor: Olaf Vancura, Las Vegas, NV (US)

(73) Assignee: Mikohn Gaming Corporation, Las Vegas, NV (US)

( * ) Notice: Subject to any disclaimer, the term of this patent is extended or adjusted under 35 U.S.C. 154(b) by 8 days.

This patent is subject to a terminal disclaimer.

(21) Appl. No.: 10/161,498

(22) Filed: Jun. 3, 2002

(65) Prior Publication Data

US 2003/0036423 A1 Feb. 20, 2003

Related U.S. Application Data

(63) Continuation of application No. 09/540,259, filed on Mar. 31, 2000, now Pat. No. 6,398,218, which is a continuation of application No. 09/346,210, filed on Jul. 1, 1999, now Pat. No. 6,059,289, and a continuation of application No. 09/260,634, filed on Mar. 2, 1999, now Pat. No. 6,033,307.

(60) Provisional application No. 60/077,042, filed on Mar. 6, 1998, and provisional application No. 60/077,511, filed on Mar. 6, 1998.

(51) Int. Cl.[7] .......................... A63F 13/00; G07R 17/34

(52) U.S. Cl. ............................ 463/20; 463/25; 463/42; 463/16; 273/138.1; 273/143 R; 273/139

(58) Field of Search .......................... 273/143 R, 138.2, 273/139; 463/16, 20–21, 25, 4 Z

(56) References Cited

U.S. PATENT DOCUMENTS

| | | | |
|---|---|---|---|
| 4,448,419 A | | 5/1984 | Telnaes |
| 4,570,934 A | | 2/1986 | Smyth |
| 4,805,907 A | | 2/1989 | Hagiwara |
| 4,837,728 A | | 6/1989 | Barrie et al. |
| 5,067,712 A | | 11/1991 | Georgilas |
| 5,205,555 A | | 4/1993 | Hamano |
| 5,241,379 A | | 8/1993 | Tsujita |
| 5,393,057 A | | 2/1995 | Marnell, II |
| 5,397,125 A | | 3/1995 | Adams |
| 5,494,287 A | | 2/1996 | Manz |
| 5,560,603 A | | 10/1996 | Seelig et al. |
| 5,580,309 A | | 12/1996 | Piechowiak et al. |
| 5,647,798 A | | 7/1997 | Falciglia |
| 5,722,891 A | | 3/1998 | Inoue |
| 5,823,874 A | | 10/1998 | Adams |
| 5,848,932 A | | 12/1998 | Adams |
| 6,398,218 B1 | * | 6/2002 | Vancura ................... 273/138.1 |

FOREIGN PATENT DOCUMENTS

| | | |
|---|---|---|
| DE | 3638 099 A1 | 5/1988 |
| EP | 148 001 A2 | 7/1985 |
| EP | 874 337 A1 | 10/1998 |
| GB | 2 084 371 A | 4/1982 |
| GB | 2 180 087 A | 3/1987 |
| GB | 2 181 589 A | 4/1987 |
| GB | 2 222 712 A | 3/1990 |
| JP | 6-277331 | 4/1994 |

* cited by examiner

*Primary Examiner*—Derris H. Banks
*Assistant Examiner*—Alex F. R. P. Rada, II
(74) *Attorney, Agent, or Firm*—Dorr, Carson, Sloan & Birney, P.C.

(57) ABSTRACT

A method is set forth for playing a bonus game in a secondary slot machine adjacent a primary slot machine. The primary slot machine issues a bonus qualifying signal to the secondary slot machine to start play of a bonus game when a bonus qualifying event occurs. The reels of the bonus game include value symbols, null symbols, and end game symbols which may be of two basic types: a lose game symbol and a stop game symbol. After the random spin, the values of any value symbols displayed on the payline of the secondary slot machine are accumulated into an accumulated winning value. The value symbols could include positive integer values, negative integer values, and multiples. The random spinning, determination of values of any value symbol and the accumulation of a winning value is repeatedly continued until an end of the bonus game occurs.

46 Claims, 5 Drawing Sheets

GAMING MACHINES WITH BONUSING

RELATED APPLICATION

This application is a continuation of "GAMING MACHINES WITH BONUSING", Ser. No. 09/540,259 filed Mar. 31, 2000 issued as U.S. Pat. No. 6,398,218 on Jun. 4, 2002 which is a continuation of the patent entitled "GAMING MACHINES WITH BONUSING", Ser. No. 09/346,210 filed Jul. 1, 1999 issued as U.S. Pat. No. 6,059, 289 on May 9, 2000 and a continuation of "GAMING MACHINES WITH BONUSING", Ser. No. 09/260,634 filed Mar. 2, 1999 issued as U.S. Pat. No. 6,033,307 on Mar. 7, 2000 which claims priority to the provisional applications entitled "ADJACENT SLOT MACHINES WITH BONUSING", Ser. No. 60/077,042 filed Mar. 6, 1998 and Ser. No. 60/077,511 filed Mar. 11, 1998.

BACKGROUND OF THE INVENTION

1. Field of the Invention

The present invention relates to gaming machines and, in particular, gaming machines such as slot machines incorporating a bonusing game.

2. Statement of the Problem

It is well known in the gaming industry that bonus games attract and keep players at a gaming machine. The bonus game is typically another gaming machine or a random selection device which is enabled by a bonus qualifying signal from an underlying or primary gaming machine. A wide variety of bonus games, features, and devices are known some of which are set forth next.

The conventional WHEEL OF GOLD (trademark) and WHEEL OF FORTUNE (trademark) slot casino games incorporate a single play bonusing feature. A rotating wheel is activated by the player depressing a bonus spin button when certain indicia appears on the reels of the slot game and is used to award bonus payouts in a spin of the wheel. A separate multiplier may be used to multiply the bonus payouts. After the bonus spin, play resumes in the underlying gaming machine. These games are commercially available from Anchor Gaming and are disclosed in U.S. Pat. Nos. 5,823,874 and 5,848,932.

In EP 0 874 337 A1, "Gaming Machine with Bonus Mode" published Oct. 10, 1998 and owned by WMS Gaming, Inc., a bonus game involving multiple plays is presented for an underlying gaming machine such as a slot machine. Here a Bernoulli trial procedure is used to allow a player to repeatedly play a high odds bonus game (such as another slot game) and receive awards until a losing combination occurs (i.e., winning until losing). The hit rate in the bonus game is greater than 50% (preferably higher than 70%) which results in a much lower hit rate in the underlying game. This hit rate difference causes the player to endure the low hit rate of the underlying slot game in order to qualify for the high hit rate of the bonus game. The length of the bonus game is longer when the hit rate for the bonus game is higher. This bonus feature allows a player to win each bonus game and collect winnings until the player receives a losing combination (i.e., losing until winning). This is a variation of WMS Gaming's earlier bonus feature trademarked JACKPOT STAMPEDE which allowed the player in the bonus game to continually spin the bonus reels until receiving a winning combination. The recognized shortcoming with this earlier bonus feature was that the player's expectation of receiving meaningful bonus awards is crushed since the first winning combination to be hit is statistically a small award (i.e., a cherry). Other high odds and "win till you lose" bonus games are found in UK Patent Application GB 2 180 087 A published Mar. 18, 1987 and GB 2 084 371 A published Apr. 7, 1982.

U.K. Patent Application GB 2 222 712 A published Mar. 14, 1990 sets forth a slot machine main game interconnected with a slot machine secondary game. The player has the option of pushing button 18 which debits his credit meter by the appropriate amount to play the secondary game such as another slot game. Hence, the player gambles an amount in order to play the bonus game.

U.S. Pat. No. 5,393,057 pertains to an electronic gaming apparatus and method therefor wherein each play in the bonus is the result of successive underlying game play. The invention teaches the use of an electronic primary gaming device such as a poker or a slot machine and an electronic secondary gaming device based on bingo. When a winning combination such as three queens appears in the primary game, a space in the bingo matrix is turned over to reveal a bingo symbol. Play continues on the primary game until a winning sequence occurs in the bingo game. The right to play the bingo secondary game does not occur unless the player inserts three or more coins into the primary game. Play continues until the game achieves a bingo in which case the player receives a prize. UK Patent Application GB 2181 589 A published Apr. 27, 1987 pertains to a slot machine having a jackpot feature whereby the prize value is transferred between separate jackpot displays as successive games are played. Some of the reel symbols are overprinted with a number and when that number lands on the payline, it is used to climb a ladder. The ladder enables the player to obtain one or all of the prizes in the upper portion of the slot machine. For example, if the overlaid number lands the player on a first playing level, then the player receives all three prizes. If the overlaid number lands the player on a second level, then the player can select which one of the three prizes to receive. If the player lands on a third level, then it becomes a game of skill to select which of the three prizes he selects. Finally, if the player lands on a fourth level, then the prize is randomly selected. The prize may also be randomly doubled. U.S. Pat. No. 5,560,603 sets forth a plurality of slot machines interconnected to an electronic controller which displays a separate race game. Each time a particular predetermined combination of indicia appears in the display of a particular slot machine, a signal is generated from the slot machine which advances the racing element through a particular predetermined distance. If the player's horse reaches the finish line before a timer display times out, then the slot player wins an additional prize. The players in this patent are not racing against each other, but against a clock.

A former popular television game show trademarked THE JOKER'S WILD by Jack Barry Productions, Inc., permitted a player at the end of the show to play a giant slot machine until reaching a predetermined level of winnings, stopping with a lesser level of winnings, or being forced to stop (and losing everything) when a special symbol appeared on one of the three slot wheels. In the conventional THE JOKER'S WILD slot machine, the special symbol was a picture of a "devil."

A need exists to adapt the excitement created by such the aforesaid television game show through continued play of a bonus gaming machine such as a slot machine with the expectation of additional accumulation to an underlying gaming machine, but with the danger of losing all accumulated winnings. A need exists to provide a riskless initial award to the player upon entering the bonus game which cannot be lost in the bonus game. A need exists to provide a bonus feature for an underlying game that allows the operator to control the length, player enjoyment and player involvement in the bonus mode so that the bonus game doesn't have to be an automatic "win until a lose" or "lose until a win" occurs.

SUMMARY OF THE INVENTION

1. Solution to the Problem.

The present invention solves the above needs by providing adjacent gaming machines where the first gaming machine plays a conventional slot gaming machine and the second gaming machine provides the bonusing feature also in a slot gaming machine. In one embodiment, all of the accumulated winnings may be lost during bonus game play. A player, in one embodiment, entering the bonus game is initially awarded a riskless value. The design of the bonus game allows the operator to control the length of the bonus game and the player involvement and enjoyment therein.

2. Summary.

The present invention provides two adjacent gaming machines. In the preferred embodiment, the gaming machines are slot machines and each slot machine employs physical reels with stops that are equally likely to happen and wherein each reel has a predetermined number of stops. In the primary slot machine, a bonusing qualifying event is used to enable a player to play the secondary slot machine containing the bonus game. The bonusing game on the secondary machine proceeds in a cumulative fashion with the player stopping when special "lose" or "stop" play symbols appear on the payline, when the player issues a stop signal, when a predetermined amount of winnings occurs, when a predetermined number of spins occurs, or any combination thereof.

A method is set forth for playing a bonus game in a secondary slot machine adjacent a primary slot machine. The secondary slot machine has a number of reels and a payline. The primary slot machine issues a bonus qualifying signal to the secondary slot machine to start play of a bonus game when a bonus qualifying event occurs. The method of the present invention randomly spins the reels in the secondary slot machine. The reels include value symbols and end game symbols which may be of two basic types: a lose game symbol and a stop game symbol. After the random spin, the values of any value symbols displayed on the payline of the secondary slot machine are accumulated into an accumulated winning value. The value symbols could include positive integer values, negative integer values, and multiples. The random spinning, determination of values of any value symbol and the accumulation of winning values is repeatedly continued until an end of the bonus game occurs. The end of the bonus game can occur in a number of ways. In one embodiment, a predetermined number of bonus game end symbols are afforded the player to be obtained during play of the bonus game. If the predetermined number is one, then the bonus game ends upon the first occurrence of an end symbol. When the predetermined number is greater than one, the number of end game symbol appearances on the payline are counted and when the predetermined number is reached, the bonus game is over. When the end game symbol is a stop game symbol, the bonus game stops when the stop symbol appears on the payline and the accumulated winnings are awarded to the player. When the end game symbol is a loss symbol, all or a portion of the accumulated winnings is retained by the operator of the game. The player has the option in some versions of the bonus game to issue a stop signal in the case of an end game symbol being a lose symbol and, if the player issues a stop signal before the predetermined number of game symbols is reached, then the player is awarded the accumulated winnings value. Under the method of the present invention, and in some embodiments, an initial riskless value is immediately awarded the player upon the issuing of the bonus qualifying signal so that the player is awarded regardless of the outcome of the bonus game.

In another version of the bonus game of the present invention, the symbols include null symbols which allow the operator of the bonus game to control the length of the bonus game by having the results of random spins containing no value symbols.

The method of the present invention under one version ends the bonus game when the accumulated winnings value equals or exceeds a predetermined winnings value which provides protection to the operator against a player who continues to win all random spins.

In other versions of the method of the present invention, the player has the opportunity to purchase lose symbols with available credits in the accumulated winnings value obtained during the bonus game to lengthen the bonus game for the player in the hopes of accumulating even more bonus awards. The purchased lose symbols allow the player to reduce the current count of lose symbols towards the predetermined number. In a variation of this, the player in playing the underlying game can acquire lose symbol credits which can be similarly used in any resulting bonus game.

In a variation of the method of the present invention, a player who continually avoids the end of the bonus game and who reaches a certain count value of spins in the bonus game automatically receives an overall jackpot award. Likewise, a limit value can be set into the bonus game to prevent the player from playing beyond a certain number of spins and when the number of spins equals the limit value, the bonus game ends and the player is awarded the accumulated winnings value.

All of these features alone or in combination with each other allow the operator of the bonus game of the present invention to control the length of time the bonus game occurs, control the player excitement and enjoyment of the game, and provide player interaction with the bonus game.

DETAILED DESCRIPTION OF THE INVENTION

1. Overview.

Figure 1:
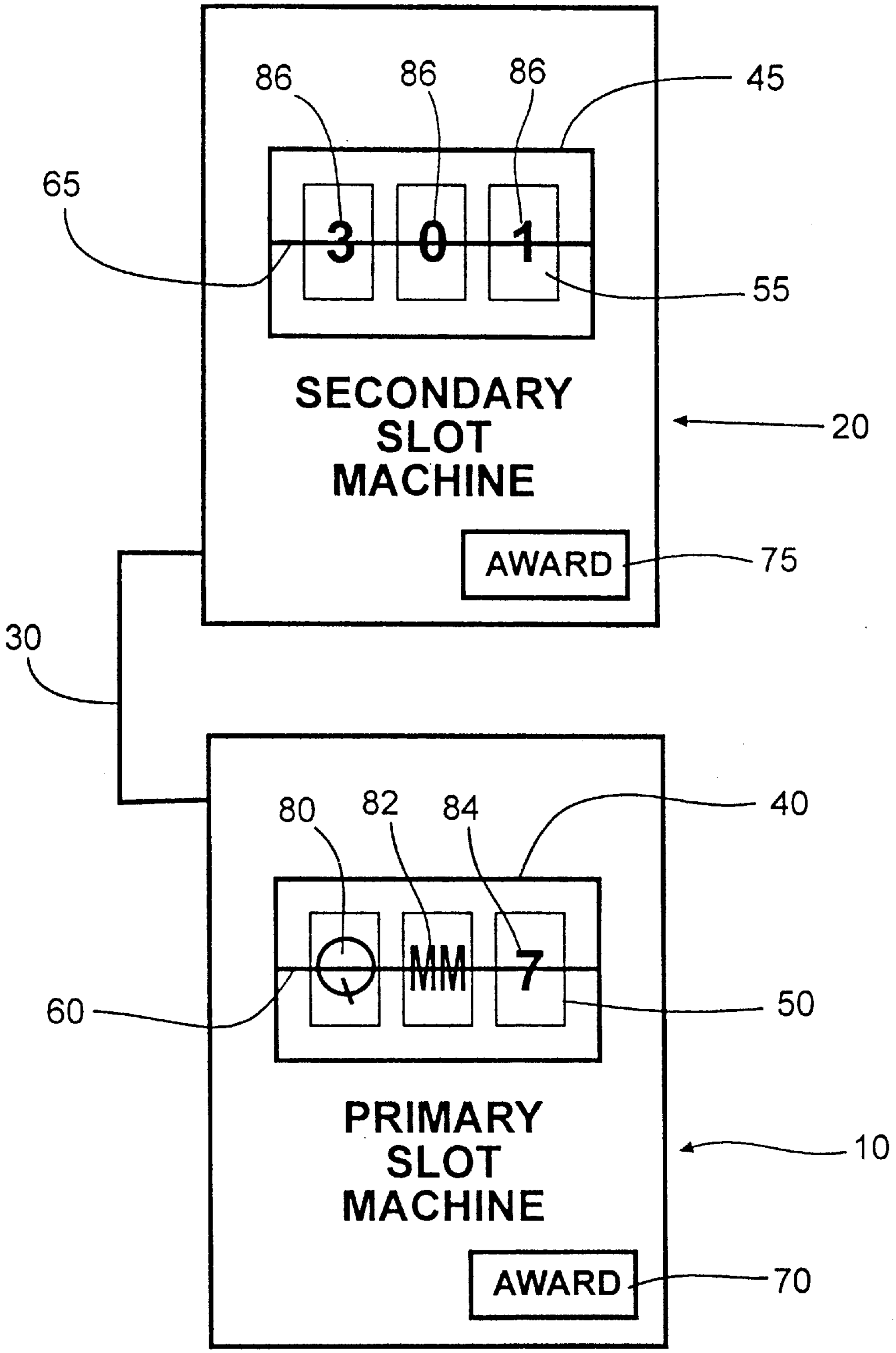
FIG. 1 shows the relationship of the secondary slot machine to the primary slot machine.

The primary gaming machine 10 of the present invention functions as a traditional gaming machine such as a slot machine as shown in FIG. 1. A unique symbol or combination of symbols are utilized to invoke the bonus game ("game within a game") upon the occurrence a qualifying bonus event. The primary slot machine 10 has a window 40 having a payline 60 and three reels 50. The secondary slot machine 20 also has a window 45, three reels 55, and payline 65. The primary slot machine 10 communicates over communication path 30 to the secondary slot machine 20 when a bonus qualification event occurs. Each machine 10, 20 has an award meter 70, 75.

The design of gaming machines 10 and 20 are well known in the industry and any of a suitable number of conventionally available machines could be programmed according to the teachings presented herein. It is to be expressly understood that the machines 10 and 20 could physically be separate machines having separate housings, integrated into the same housing, or otherwise suitably presented to the playing public. In other embodiments, a single gaming processor or the like could be utilized to run both display windows 40 and 45 thereby resulting in a savings so that each machine 10 and 20 does not duplicate hardware. The primary slot machine 10 and the secondary slot machine 20 are adjacent each other. The term "adjacent," as used herein, means on-top-of each other, side-by-side to each other, or near each other whether in the same housing or in separate housings (as shown in FIG. 1).

The primary gaming machine 10 can be any suitable gaming machine such as slot, poker, keno, etc. and it is to be understood that the secondary gaming machine 20 can be the same or different than the primary gaming machine or can be any other suitable gaming machine. In the preferred embodiment, both gaming machines 10 and 20 are slot gaming machines. Furthermore, the slot gaming machines 10 and 20 can be each comprised of a mechanical slot machine, each comprised of a video slot machine, or a combination there between. For purposes of understanding the teachings of the present invention, and in the preferred embodiment of slot machines, each slot machine 10 and 20 has at least one payline 60, 65; at least one reel 50, 55; although in the preferred embodiment, each slot machine 10 and 20 has three reels.

In the following, the term "on the payline" means a symbol centered on payline 60 or 65 after completion of a spin. However, the appearance of the symbol in the window 40 or 45 or near the payline would be equivalent.

2. Embodiments.

Three preferred embodiments of the bonus game of the present invention are disclosed in the following.

Figure 4:
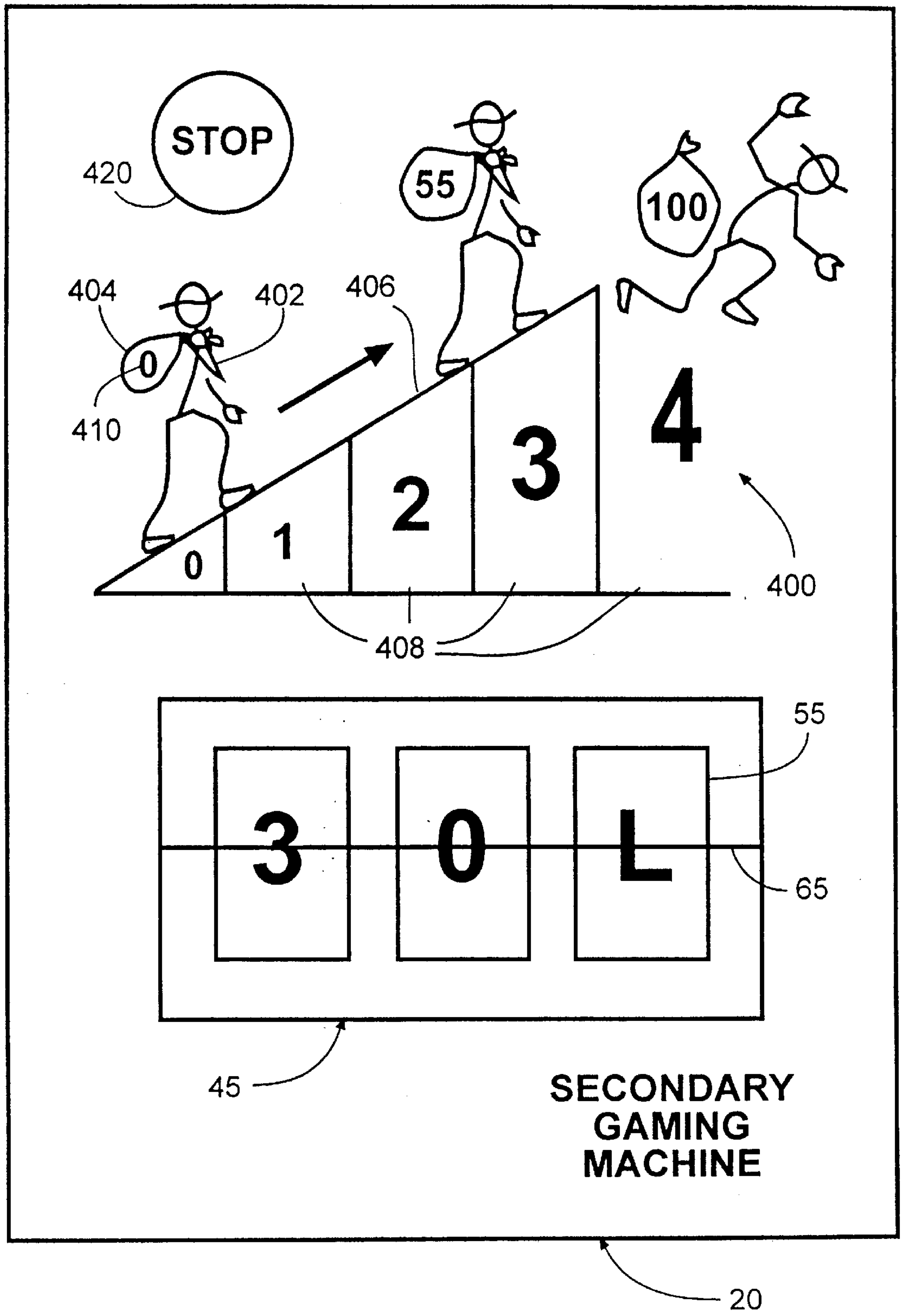
FIG. 4 is an illustration showing the operation of the display in the secondary gaming machine during the bonus game.

A. Embodiment No 1:

The player after entering the bonus game starts at zero credits, continues to spin the reels 55 in the secondary slot machine 20 and accumulates winnings until reaching a predetermined amount of credits. The player may stop at any point and keep the accumulated winnings. A "lose" symbol, for example, (such as an "L" symbol as shown in FIG. 4) on the payline 65 of any reel 55 in the secondary slot machine 20 eliminates the player with the casino taking all accumulated winnings. Unlike the conventional TV show, by reaching the bonus game 20, the player automatically is credited with some minimum win (e.g., 20 coins) prior to beginning the bonus game. A player who reaches the bonus game 20, under this embodiment, is always a winner.

Figure 2:
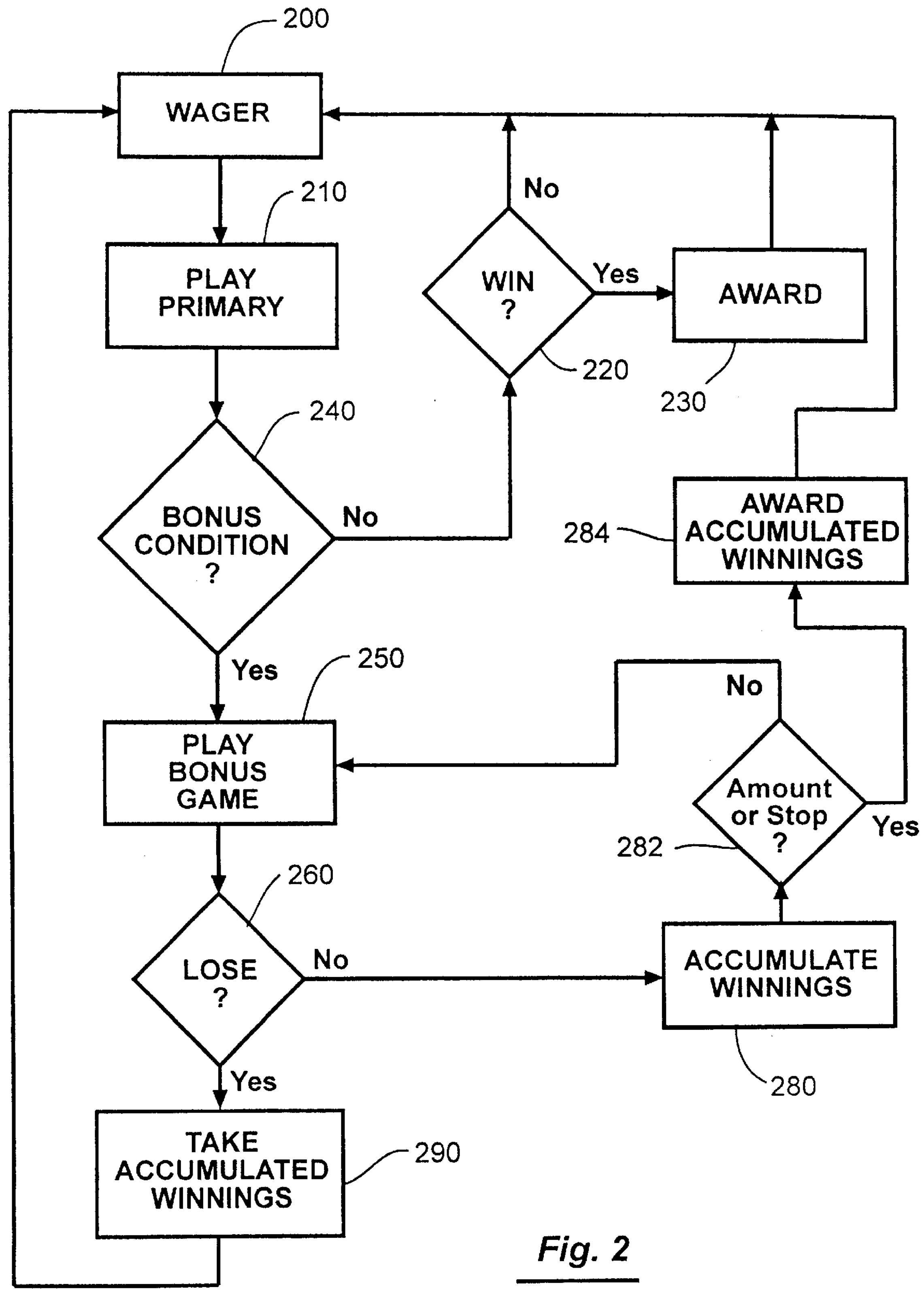
FIG. 2 sets forth a functional flow chart of one of the preferred embodiments of operation.

The functional flow chart for implementing Embodiment No. 1 in gaming machines 10 and 20 is shown in FIG. 2. In FIG. 2, the player places a wager 200 in primary slot machine 10 in a conventional fashion. In stage 210 the primary slot machine 10 is conventionally played. If a bonus condition does not occur in stage 240, as a result of game play, a determination is made in stage 220 whether the combination on payline 60 results in a winning combination. This is a conventional step. If a winning combination exists, stage 230 is entered and an award is made such as incrementing a conventional credit meter 70. The player can then re-enter stage 200 to place a new wager. The loop involving stages 200, 210, 220, and 230 is conventional.

In the event, in stage 240, that a bonus qualifying event occurs such as the appearance of MM 82 on payline 60 in FIG. 1 (also shown are a cherry 80 and a red seven 84). The player receives an initial riskless award. A signal is then delivered over line 30 to the secondary slot machine 20, and the secondary slot machine 20 is functionally programmed as follows. The bonus game is then played in stage 250 such as by randomly rotating the reels 55. At the end of an individual bonus game, in stage 260, a determination is made whether a "lose" symbol occurs on the payline 65. If not, any winning values on the payline 65 are accumulated in stage 280. As shown in FIG. 1, the value symbols 86 of {3, 0, 1} are shown and the accumulated value is 3+0+1=4 credits. Such accumulated winnings 280 can be conventionally displayed in meter 75 near the secondary slot machine. In stage 282 a determination is made whether the player desires to stop or whether the accumulated winnings in stage 280 has reached a predetermined amount. Hence, if accumulated winnings in stage 280 equal or exceed the predetermined amount, the bonus game is over and stage 284 is entered to award the accumulated winnings to the player. Also in stage 282 when a player generated stop signal is generated in stage 282, stage 284 is also entered. Hence, the player can stop play of the bonus game and take the accumulated winnings and receive it as an award in stage 284. If no player stop signal is sensed and a predetermined amount of winnings is not obtained, play resumes in the bonus game stage 250 and the process continues until either a lose symbol occurs on the payline 65 in stage 260, a predetermined amount is sensed in stage 282, or the player issues a stop signal in stage 282. In this fashion, the primary and secondary gaming machines 10 and 20 of the present invention can be programmed to implement the teachings of this one preferred embodiment. It is to be expressly understood that in stage 282 that while a play stop signal is sensed or a predetermined amount occurs to end the bonus game that either condition without the other condition could be used.

Variations on this embodiment include enabling the player to push a stop button (or otherwise generate a stop signal) at anytime during the bonus game. This would act as an interrupt signal and immediately end the bonus game. Hence, a player could issue the stop signal while the reels 65 are spinning and the results of the spin would be ignored.

B. Embodiment No. 2:

This embodiment is similar to Embodiment No. 1, except that a "lose" symbol on the payline 65 of secondary slot machine 20 results in the player losing a portion (e.g., 50% or 10 coins) of the prior accumulated winnings, the player retaining the remainder of the accumulated winnings.

With reference to FIG. 2, in stage 290 only a portion of the accumulated winnings are taken based upon a fraction, percentage, or actual number of coins as set forth above. In all other aspects the bonus game is the same. For example, assume the accumulated winnings are 100 coins. A "lose" symbol on payline 65 causes a 50% lose so that the player still wins 50 coins. Had the player issued a stop signal in stage 282 before the lose signal occurred, then the player receives all 100 accumulated coins.

C. Embodiment No. 3:

The appearance of a special "stop" symbol (such as, for example, a stop sign) on the payline 65 does not take all player winnings but instead serves to end the bonus game. The player is paid all bonus winnings accumulated prior to the final spin (the player would not have an option to stop at any point in this embodiment).

Figure 3:
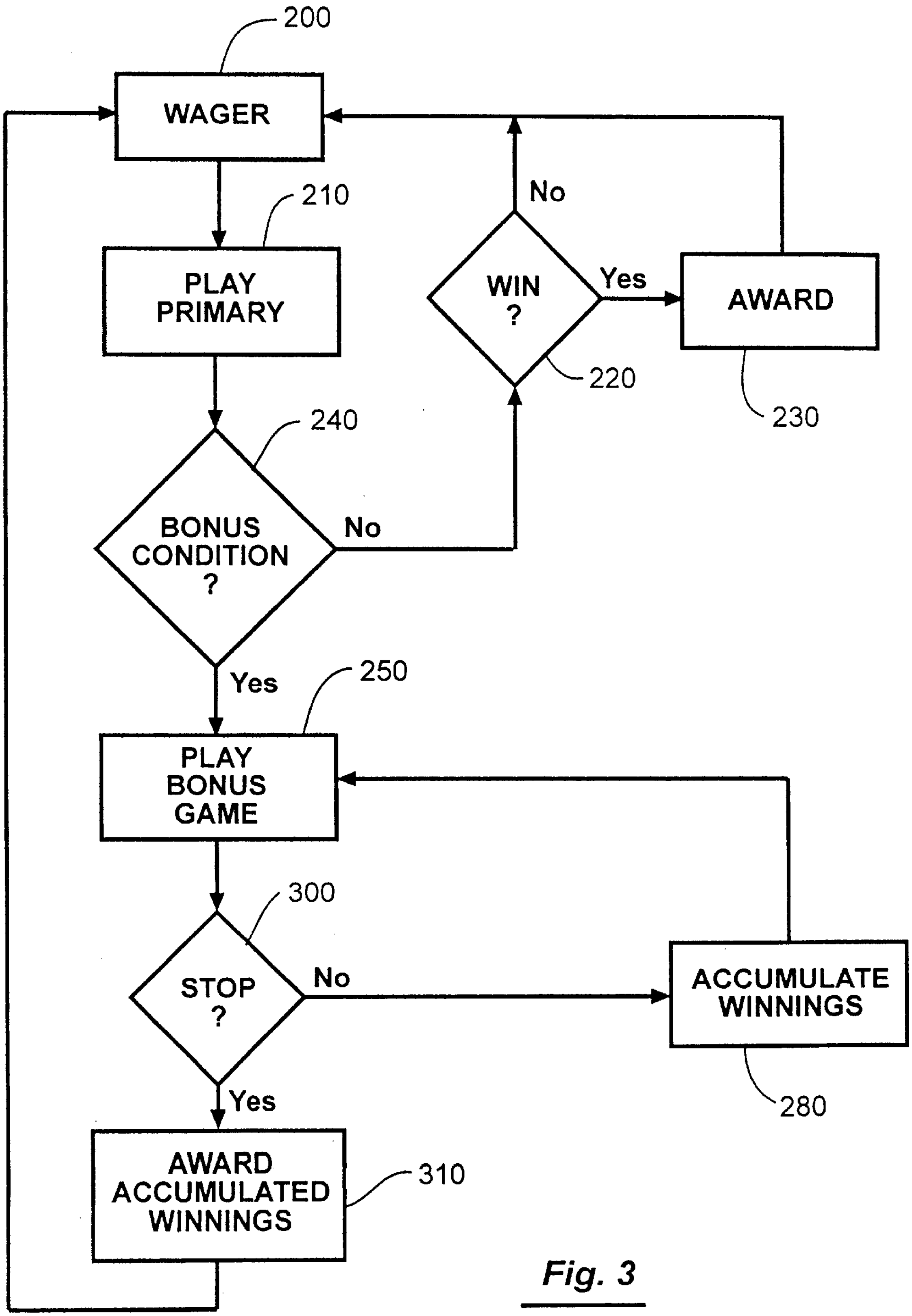
FIG. 3 sets forth a functional flow chart of a second preferred embodiment of operation.

In FIG. 3, the functional flow chart is presented for this embodiment. The flow chart uses many stages in FIG. 2 and the stages are commonly identified with the same reference numerals in FIG. 3. However, in stage 300, if bonus game play in stage 250 results in the appearance of a "stop" symbol on the payline 65, stage 310 is entered which awards any accumulated winnings to the player. As long as the stop symbol does not appear in stage 300, stage 280 is entered to accumulate the winnings, if any, and play continues in the bonus game of stage 250.

Any suitable end game symbols can be used in the reels 55 of the slot machine 20. In the first two embodiments, the end game symbol is a "lose" symbol and in the third embodiment it is a "stop" symbol. Arbitrary symbols can be used with no difference in game play whatsoever. For example, "bonus" symbols can be used on the primary machine (to activate the bonus game) and "Stop Sign" symbols can be used on the secondary machine (to end the bonus game), and so forth.

3. Detailed Description.

As set forth above, a number of embodiments and variations thereto are possible under the teachings of the present invention. The following example, appropriately modified, can be used in all three embodiments set forth above.

One preferred embodiment of the present invention employs three physical reels 50 and 55 for both the primary and secondary slot machines 10 and 20 in FIG. 1. Each reel is arbitrarily assigned an equal probability of 1/22 to each of 22 stops (i.e., the preferred number of stops). This embodiment uses physical reels with stops that are equally likely to happen. The following discussion is based upon this embodiment. However, the teachings of the present invention can be used with slot machines (either or both the primary 10 and secondary 20 slot machines) where each stop is not equally likely to occur such as is taught, for example, in U.S. Pat. No. 4,448,419 and where the predetermined number of stops can be any number and where the predetermined number of stops in the secondary gaming machine 20 can be greater than, equal to, or lesser in number than the predetermined number of stops in the primary gaming machine 10.

The primary slot machine 10 functions as a normal slot machine, except that if two "bonus" symbols appear on the payline, then a bonus qualifying event in the form of a signal appears on line 30 and play enters the bonus mode of the present invention. The bonus symbols can appear on the payline 65 or, in some versions, in the window 45.

The bonus qualifying event for the bonus game of the present invention is the appearance of a bonus symbol or bonus symbols at the primary gaming machine 10 resulting in a bonus qualifying signal on line 30. However, any suitable bonus qualifying event could be utilized such as a combination of symbols appearing on the payline of the primary machine, the occurrence of a random event which is unrelated to the game outcome of the primary gaming machine 10, a function of the number of coins played, and the like. The qualifying event may also be a function of an accumulated value in the winnings of the primary gaming machine 10. Any suitable qualifying event (or mechanism) signal appearing on line 30 from the primary game 10 could be utilized to start play of the bonus game 20.

The bonus game in this embodiment consists of the player being rewarded with some initial value such as fifteen coins (credits), followed by bonus play on the secondary machine 20. On the secondary machine 20, any "lose" symbol that appears on the payline 65 ends the secondary game, with the player being rewarded with any accumulated winnings. If no "lose" symbol appears on the payline, the values (numbers) that do appear on the payline are added to determine the reward for the spin, which is added to the accumulated winnings.

A. Primary Slot Machine 10

In this preferred embodiment, the primary slot machine 10 is a three-coin slot machine utilizing three reel strips of twenty-two stops shown in Table I.

TABLE I

| Strip 1 | Strip 2 | Strip 3 |
|---|---|---|
| C | C | C |
| — | — | — |
| B | B | B |
| — | — | — |
| BB | BB | BB |
| — | — | — |
| MM | MM | MM |
| — | — | — |
| B | B | BB |
| — | — | — |
| BBB | BBB | BBB |
| — | — | — |
| B | B | B |
| — | — | — |
| MM | B | MM |
| — | — | — |
| C | C | C |
| — | — | — |
| R7 | R7 | R7 |
| — | — | — |
| BB | BBB | BB |
| — | — | — |

Where the following symbols are used:
B = Single bar
BB = Double bar
BBB = Triple bar
C = Cherry
MM = Money Machine (i.e., bonus symbol)
R7 = Red 7
— = Blank The primary slot machine 10 itself functions in this example as a conventional "pay per view" pay table. That is, the first coin inserted "buys" payoffs for combinations of Cherries. The second coin adds payoffs for Bars, but leaves the first coin payoffs the same. The third coin adds payoffs for MM, Red 7s, as well as the possibility of participating in the bonus game. Note that the additional coins, in this embodiment, do not act as multipliers.

Table II represents a pay table of this embodiment of the present invention based upon Table I (as usual only the highest winner is paid):

TABLE II

| Winning Combination | | | Payout (coins) |
|---|---|---|---|
| | First Coin | | |
| C | a | a | 3 |
| a | C | a | 3 |
| a | a | C | 3 |
| C | C | a | 6 |
| C | a | C | 6 |
| a | C | C | 6 |
| C | C | C | 30 |
| | Second Coin Add | | |
| ab | ab | ab | 30 |
| B | B | B | 60 |
| BB | BB | BB | 90 |
| BBB | BBB | BBB | 150 |

TABLE II-continued

| Winning Combination | | | Payout (coins) |
|---|---|---|---|
| Third Coin Add | | | |
| MM | MM | a | Bonus Game |
| MM | a | MM | Bonus Game |
| a | MM | MM | Bonus Game |
| MM | MM | MM | 375 |
| R7 | R7 | R7 | 1200 |

Where, in addition to the above symbols:
a = Any symbol
ab = Any bar

For example, with a first coin played, a payline combination of "C B C" would be paid six coins. The same payoff would result for three coins played. However, with three coins played, a payline 60 combination of {"R7, MM, MM"} would result in the bonus game occurring. Under this embodiment, a player could only qualify for playing the secondary slot machine 20 (bonus game), if the player inserts three coins.

A combinational routine cycling through each of the 22×22×22=10,648 combinations is shown in Tables III–V:

TABLE III

| First Coin | |
|---|---|
| Payout (in coins) | Number Games |
| 0 | 8000 |
| 3 | 2400 |
| 6 | 240 |
| 30 | 8 |
| Pays: | 2648 |
| Losers: | 8000 |
| Pay Frequency: | 24.9% |
| House Advantage (Hold): | 16.60% |

TABLE IV

| First and Second Coins | |
|---|---|
| Payout | Number Games |
| 0 | 7748 |
| 3 | 2400 |
| 6 | 240 |
| 30 | 228 |
| 60 | 24 |
| 90 | 6 |
| 150 | 2 |
| Pays: | 2900 |
| Losers: | 7748 |
| Pay Frequency: | 27.2% |
| House Advantage (Hold): | 16.60% |

TABLE V

| First and Second and Third Coins | |
|---|---|
| Payout | Number Games |
| 0 | 7595 |
| 3 | 2384 |
| 6 | 240 |

TABLE V-continued

| | |
|---|---|
| 30 | 228 |
| 60 | 24 |
| 90 | 6 |
| 150 | 2 |
| 375 | 4 |
| 1200 | 1 |
| Bonus | 164 |
| Pays: | 3053 |
| Losers: | 7595 |
| Pay Frequency: | 28.7% |
| House Advantage w/Bonus = | 51 coins |
| (Hold): | 9.92% |

In this fashion, the player is encouraged to wager the full three coins not only by the allure of the bonus game, but also the benefit of a higher percentage payback.

As mentioned earlier, the above discussion is based upon the predetermined number of stops (i.e., twenty-two physical stops) being equally likely to occur (Table I). However, when the stops of the slot machine are not equally likely to occur, the reel strips of Table I may be employed as virtual reels on a slot machine with a lower number of physical reel stops (e.g., seven physical reels—one for each of the seven symbols).

B. Secondary (Bonus Game) Slot Machine 20

In this embodiment, the secondary slot machine 20 is a slot machine utilizing the reel strips of twenty-two stops shown in Table VI.

TABLE VI

| Strip 1 | Strip 2 | Strip 3 |
|---|---|---|
| 5 | 5 | 5 |
| 0 | 0 | 0 |
| 4 | 4 | 7 |
| 0 | 0 | 0 |
| 8 | 15 | 9 |
| 0 | 0 | 0 |
| 3 | 5 | 3 |
| 0 | 0 | 0 |
| L | L | L |
| 0 | 0 | 0 |
| 3 | 3 | 3 |
| 0 | 0 | 0 |
| 5 | 5 | 4 |
| 0 | 0 | 0 |
| 4 | L | 3 |
| 0 | 0 | 0 |
| 10 | 3 | 10 |
| 0 | 0 | 0 |
| 4 | 4 | 4 |
| 0 | 0 | 0 |
| 6 | 6 | 3 |
| 0 | 0 | 0 |

Where the following symbols are used:
L = Lose (or = stop)
# = Numerical Value (e.g., # = 3, 4, 5, 6, 7, 8, 9, 10, 15)
0 = Null It is noted in Table VI that Strips 1 and 3 have one L symbol each and strip 2 has two L symbols. Any number of lose (or stop) symbols could be used and the number per reel can be varied. In some embodiments no lose or stop symbols could occur and a lose or stop event could occur such as when a predetermined amount is accumulated.

In some versions of the present invention, symbols other than "lose" symbols could be utilized as the mechanism to stop the bonus game of the present invention. For example, a combination of symbols on the payline 65 of the secondary gaming machine 20 such as three blanks, three like symbols, a stop-sign signal, etc. could be used as a stopping mechanism.

As mentioned above, the player is preferably awarded an initial bonus value such as 15 credits (coins, etc.) for entering the bonus game. The initial bonus value is optional and could be present or not. The initial bonus value can immediately be applied to the credit meter 70 associated with slot machine 10.

Thereafter, for each spin, and assuming no "lose" symbol appears on the payline 65 of the second slot 20, the numerical symbols are added together to determine the reward per spin. For example, a spin of {"5, 0, 7"} on the payline 65 would be rewarded with 12 additional credits, and so forth. The "numerical values" are summed on the payline 65. A spin, e.g., of {"0, 6, L"} on the payline 65 would end the game, with all credits prior to the last spin being awarded to the player.

Note that in this particular case, the first and third reels each only have one "lose" symbol, while the second reel has two "lose" symbols in Table VI. This results in a probability of not "losing", per spin, equal to $\frac{21}{22}\times\frac{20}{22}\times\frac{21}{22}=0.8283$. Thus, if re-spins occur until reaching a "lose" symbol, this results in an average bonus playing length of $1/(1-0.8283)=5.825$ spins. Since the last (necessarily "lose") spin does not count toward accumulation, on average a player will have 4.825 bonus spins during which non-lose accumulation occurs. In some versions of the bonus game of the present invention the last spin could include any "numerical values" on the payline in the accumulated winnings.

Turning now to the other reel strip values, the averages for the numerical stops are 2.476, 2.5, and 2.429, for the first, second, and third reel, respectively in Table VI. This leads to an average gain, per non-lose spin, of 7.405 coins. Thus, the overall value for the bonus game in this embodiment, is simply the initial bonus awarded (fifteen coins) plus the product of the average non-lose spins and the average non-lose value per spin. This is $15+4.825\times7.405=50.73$ coins (see the reference to fifty-one coins in the house advantage calculation above under Table V).

In summary, for the above embodiment, the average length of play for the bonus game is 5.825 spins (of which 4.825 are accretive), with an average expected value of 50.73 credits.

The use of null symbols (i.e., "0" in the reel strips) in Table VI allows the operator to increase the number of bonus spins or the length of the time the player spends playing the secondary machine 20. The more likely it is to receive {0, 0, 0}, i.e., a neutral spin, on payline 65, the longer the bonus game takes. Furthermore, each time a zero is received on a reel, the game is effectively lengthened with no additional accumulation in value.

A variation on the above embodiment is to have the primary slot machine 10 function as a traditional coin multiplier. The bonus game 20 is still played exactly as before. That is, the reel strips of the prior embodiment for both the primary and secondary machines 10 and 20 are used, but the reels for the primary slot 10 are modified as follows:

TABLE VII

| First Coin | | | |
|---|---|---|---|
| Winning Combination | | | Payout (in coins) |
| C | a | a | 1 |
| a | C | a | 1 |
| a | a | C | 1 |
| C | C | a | 2 |
| C | a | C | 2 |
| a | C | C | 2 |
| C | C | C | 10 |
| ab | ab | ab | 10 |
| B | B | B | 20 |
| BB | BB | BB | 30 |
| BBB | BBB | BBB | 50 |
| MM | MM | a | 5 |
| MM | a | MM | 5 |
| a | MM | MM | 5 |
| MM | MM | MM | 125 |
| R7 | R7 | R7 | 400 |

Second Coin

Multiply First Coin pay table X 2.

Third Coin

Multiply First Coin pay table X 3. Plus play Bonus Game for the following winning combinations:

| | | |
|---|---|---|
| MM | MM | a |
| MM | a | MM |
| a | MM | MM |

In this fashion, when the player bets three coins, he or she qualifies to play the bonus game 20 of the present invention and actually achieves a higher expected return. With three coins played, the hold is identical to that of the embodiment (i.e., 9.2%) shown in Table V.

Or if desired, the bonus game 20 reel strips could be modified, and a multiplier on the bonus game payline introduced (i.e., "X1" for 1 coin in, "X2" for 2 coins in, "X3" for 3 coins in) so that players would be eligible for the bonus game 20 regardless of number of coins played.

While the above represents a detailed disclosure of the third preferred embodiment of the present invention, it is to be expressly understood that many variations to the invention can be made without departing from the teachings thereof. For example, the primary and secondary machines 10 and 20 may utilize a wide variety of different symbols than those set forth above to accomplish the goals of the present invention.

While the above embodiments use three reels with a predetermined number of symbols equal to twenty two, it is to be expressly understood that any number of reels could be utilized and that the number of predetermined symbols could vary. The number of reels for the primary machine could be varied to be different from the secondary machine as well as the determined number of symbols per reel in the primary and secondary machines.

The discussions above for the third embodiment can also be the basis for the first and second embodiments with the differences for these other two embodiments incorporated therein.

4. Modifications

The following sets forth a number of modifications that can be made to the embodiments of the present invention to create a wide variety of bonus games.

A. Initial Riskless Award

The bonus game of the present invention played in the secondary gaming machine 20 may also be varied with the teachings of the present invention. The bonus game may or may not start with an initial riskless award such as 20 coins in meter 70.

B. Jackpot Award

The bonus game 20 of the present invention in another version may award a jackpot bonus upon reaching a jackpot predetermined level of winnings accumulation. In the example given above and as an illustration, should the player accumulate 200 credits in the bonus game of the present invention without receiving a stop (or a lose) symbol, then the bonus game ends and the player is awarded a larger jackpot award such as 1,000 credits or other prizes. Alternately, as another illustration, should the player accumulate 500 credits before receiving a stop symbol, the player wins a progressive jackpot. This jackpot modification can be used in embodiments Nos. 1 and 2 before a "lose" symbol appears and in embodiment No. 3 before the "stop" symbol appears. In the functional flow charts of FIGS. 2 and 3, stage 280 could be used to sense the jackpot predetermined amount.

As with slot machines in general, the present invention may be interconnected into a wide-area progressive system and could be used to simultaneously play for a large jackpot bonus. As aforementioned, the large jackpot bonus may be won by achieving a predetermined level of winnings during the bonus round. Alternately, the large jackpot bonus may be won by the player "surviving" a predetermined number of spins during the bonus game 20. Here, the method of this version of the present invention would be to provide a jackpot award. The issuing of the bonus qualifying signal on path 30 would set a count value equal to zero. The count value would be incremented each time play bonus game stage 250 in FIG. 2 (or FIG. 3) is entered. When the count value equals a predetermined count value then the jackpot award is made. For example, if the average bonus playing length is 5.825 spins, a large jackpot award could be made when a player spins fifteen times. In these versions, a separate spin count display would display the current spin count which would be incremented each time stage 250 is re-entered in FIGS. 2 and 3. The preceding examples are illustrative and not meant to limit the teachings of this invention. The aforesaid method of counting spins (or plays) in the bonus game 20 can be adapted to award the accumulated winnings before an end game symbol appears. Here, a limit value would be set equal to zero in a counter upon starting the bonus game in response to the bonus qualifying signal and with each spin (or play) in stage 250 the value is incremented. When the limit value equals the predetermined limit value, the bonus game ends and the accumulated winnings are awarded. It is equivalent whether the count or limit values are set to zero and incremented or whether set to predetermined values and decremented to zero. Each spin adjusts the value by one until the adjusted value equals a predetermined value.

C. Multipliers

The bonus game of the present invention may incorporate multipliers associated with the payoffs. The multiplier may be a function of the credits played and may be randomly selected. For example, in a 4-coin maximum game in primary slot 10, the player may be eligible for the bonus game 20 with any number of coins played. An associated multiplier value for the bonus game 20 might be X1 for 1-coin played, X2 for 2-coins played, and X3 for 3-coins played, and X5 for 4-coins played, so as to encourage maximum wagering. Alternatively, the multiplier may simply be randomly selected before, during, and after the bonus game 10 and multiplied by the result of the bonus game to determine the final bonus award.

The bonus game of the present invention may employ symbols which act as multipliers when appearing on a payline. For example, the multipliers: X2, X3, X5, and X10 could selectively appear on strips one, two, and three in the example of Table VI. When, for example, the following appears on the payline 65: {X2, 3, 0}, then the payoff would be six coins. In another illustration, assume the following resultant symbol combination on the payline 65 of the secondary gaming machine 20: {3, 5, X5}, which results in a payoff (3+5)×5=40 coins. Too, the symbols may all act as multipliers (rather than be additive). For example, the symbol combination {X1, X3, X1} results in a pay of 3 coins (i.e., 1×3×1). The combination {X3, X4, X0} results in a pay of 0 coins (i.e., 3×4×0), and so forth.

D. Negative Value Symbols

To lengthen play of the bonus game 20 and to add further player enjoyment and excitement, the appearance of negative value symbols could be used to take from the accumulated winnings. Hence, whenever a negative value symbol appears, the accumulated winnings in the bonus game are debited by a value shown or represented by the symbol. For example, assume the following appears on the payline 65 based upon Table VI: {10, 3, −5}. This results in (10+3)−5=8 coins won. Eight coins would then be added to the accumulated winnings of the prior rounds in the bonus game 20. In a variation on this, the "negative value symbol" carries with it a negative integer value such as −1, −5, −10. It is to be expressly understood that the "negative value symbol" used can be any type of letter, graphic, etc. that carries this information. In yet another variation on this approach, when a player sees a "negative value symbol" on the payline 65, the value may be undetermined and subject to a separate random selection process. For example, the "negative value symbol" appears on the payline 65, and in a separate display, not shown, a random number appears representing how much is lost. This could be an actual amount, a fraction, etc. By adding negative value symbols to the reels 55 of bonus game 20, the operator has control over the length of the bonus game. The term "accumulate winnings" means adding the value (whether positive or negative) and null symbols together that appear on the reels after a spin and then performing any multiplication value symbols or any combination thereof.

E. A Predetermined Number of End Game Symbols

In yet another variation on the method of the bonus game 20 of the present invention, the event of losing and ending the bonus game occurs only when a predetermined number N of end game symbols (i.e., lose or stop) are accumulated during play of the bonus game. An example shown in FIG. 4 illustrates this variation. Assume N=4, the current value of N (Ncurr) 408 is shown in display 400 which can be a video display containing any suitable graphics, values and information. Preferably the value of N or the placement of the lose symbols on the reels are such to prevent N occurring on the first spin of the bonus game. On a three reel gaming machine with lose symbols on each reel, N must be greater than three to avoid losing on the initial spin. If a lose symbol appears only on one reel, then N must be greater than two to avoid losing on the initial spin. The value of N may be fixed (e.g., always 4), random (e.g., randomly selected upon entering the bonus game), or a function of the primary game (e.g., based upon the results of the primary game 10). In the latter case, the bonus qualifying primary game spin may determine the value of N, or the value of N may be based on accumulated results from the base game (e.g., every time a +1 symbol appears on payline 60, the value of N increments by one). By tying in accumulated results in the primary game 10 to control bonus game 20 play adds excitement to the play of both games.

The illustration of FIG. 4 shows a person 402 such as a miner carrying a bag of gold 404 up a steep hill 406. Portions of the hill are labeled with the Ncurr value 408. Each reel in this illustration has at least one lose symbol. The bonus game 20 based upon Embodiment No. 1 is played as follows. When the bonus qualifying signal occurs, the bonus game is entered. The displayed value 410 in the bag 404 is zero. The player has not yet spun the first game and the initial award (such as 20 coins) for entering the bonus game is not at risk in this illustration and therefore is not part of winnings value 410. As the player spins and accumulates winnings, the current value of the accumulated winnings is always shown in the winnings value 410 of the bag 404. Hence, as shown in the display 400 the miner 402 climbs the hill 406 until reaching portion 408 having an Ncurr value of 3. This means that the player has played the bonus game 20 and has acquired a winnings value of 55 coins and has already acquired three lose symbols. Statistically, the player could have received all three lose symbols in one spin on payline 65 or received each lose symbols in separate and remote spins. At each portion 408 the miner stays in position accumulating winnings 410 and whenever a lose symbol appears it is counted and the miner moves to the portion reflecting Ncurr. As shown, the player must make a decision when Ncurr=3 to issue a stop signal and take the accumulated winnings 410 or to risk losing all accumulated winnings by re-spinning in the hopes of winning more. If the player issues a stop signal, then display 420 can light up and the miner 402 can turn around walk down the hill 406 and deposit the accumulated winnings into the credit meter. If the player, decides to re-spin and a lose symbol L appears on the payline 65 as shown in FIG. 4, Ncurr=4 and the player loses all accumulated winnings and falls off the cliff as shown. The player never knows when the lose symbols will align on payline 65 since the very next spin all three lose symbols could align.

Variations on the illustration of FIG. 4, under the method of the present invention include the following. As a first variation, the value of N could be randomly chosen by the secondary gaming machine 20 in a range of values (e.g., in a range of 4–8) and the number of graphical portions 408 corresponding to N in the display 400 can be suitably stored in memory to accommodate the value N selected. As a second variation, the value of N could be set initially to be a predetermined number N (such as N=4) by the secondary gaming machine 20, but could be selectively added based on play results of the primary game. In the primary game 10 special symbols (e.g., +1, +2, +3, etc.) could be added to reels 50 and display 400 would show the initial value for N and any increments caused by the special symbols appearing on the payline 60 based upon the play results of the primary gaming machine. The increments based upon the primary machines results is delivered over path 30 to the secondary gaming machine 20 to provide a real-time display showing the value of N increasing during primary game play. This provides added incentive and encouragement to players to play the primary game 10. Of course, the initial value of N and the nature and incremental (or decremental) values of the special symbols in reels 50 could vary.

In addition to or in substitution for the stop signal (as displayed in display 420, a predetermined value of winnings could end the bonus game. In this variation, when the bag 404 reaches an accumulated value 410, which equals or exceeds the predetermined amount, the game is over.

In another variation, the player reaching a portion 408 would have the option to buy an increment to the value of N for a set amount of accumulated winnings such as 20 coins. For example, in FIG. 4, when the player reaches portion 408 corresponding to Ncurr=3, the player having 55 coins could, if desired, buy +2 causing the miner 402 to move to portion 408 corresponding to Ncurr=1 at which time the value 410 in bag 404 would become 15 coins (i.e., 55-20-20). This version allows the operator of the bonus game to increase the bonus game play time and to increase player involvement and enjoyment.

In another variation, multiples could be used to entice the player to continue play despite the inherent risk of losing all. For example, with respect to FIG. 4, the portion 408 corresponding to Ncurr=3 could automatically multiply the winnings of a round by a fixed amount such as X2. This adds considerable excitement towards the end of the bonus game. In a variation on this, the displayed value of Ncurr in portions 408 is the multiple for spins in that portion. Here, when the miner is at Ncurr=2, all winnings are multiplied by two, when Ncurr=3, all winnings are multiplied by three. In this version, the feature of providing a predetermined limit such as 200 coins for stopping the game would protect the operator. Hence, the player could stop the game by issuing a stop signal (player takes the value 410 of the accumulated winnings), the game would stop when accumulated winnings reach the predetermined limit (the player takes the value of the predetermined limit), or the game would stop when Ncurr=N (the player takes nothing). Again, this feature allows the operator to control the length of the bonus game and the player's excitement and enjoyment of it.

As before, negative values and null values can be added to control the length of the bonus game of FIG. 4.

5. Hardware Configuration.

Figure 5:
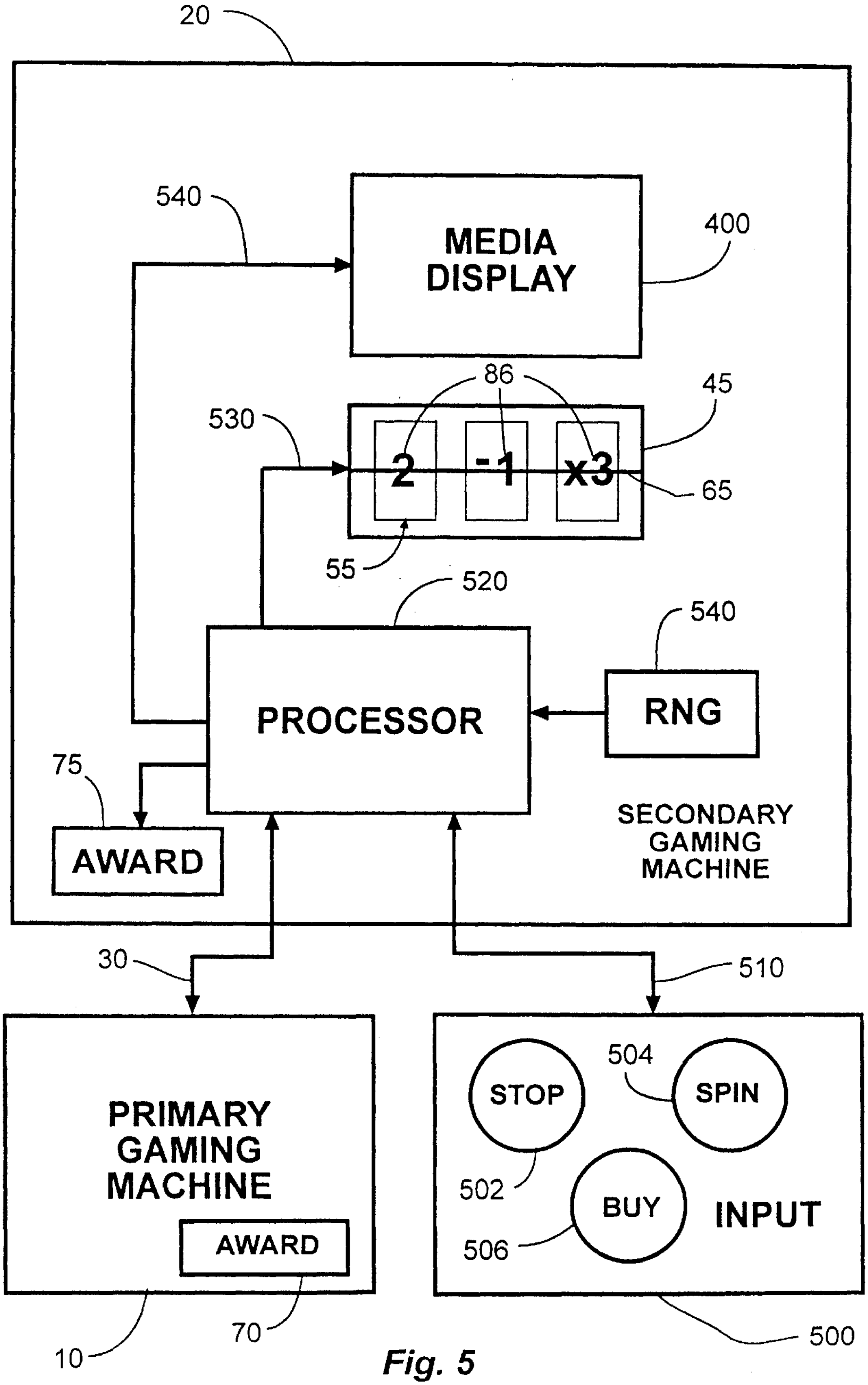
FIG. 5 is a block diagram of the components in the secondary gaming machine.

In FIG. 5 is a block diagram of one embodiment of the hardware configuration for the secondary gaming machine 20 of the present invention. Gaming machines are conventional available and any of a number of such conventionally gaming machines could be utilized for the primary gaming machine 10. The conventional devices for accepting wagers, accounting for and displaying credits during the play of the game, activating play of the game, delivering payouts to players, are all well known in the industry. As discussed, upon the occurrence of a bonus qualifying signal in the play of the primary gaming machine 10, the primary gaming machine conventionally generates such a signal on line 30 to the secondary gaming machine 20. The primary gaming machines 10 that provide secondary games or bonusing games are also modified to have a player input 500 which may be specific buttons or devices in the play area of the primary gaming machine 10. In FIG. 5, a player input 500 is shown such as push buttons 502, 504, and 506. The player input 500 communicates over line 510 to the secondary gaming machine 20. The input device 500 could also be a keyboard, mouse, joystick, or any other conventionally available input device for communicating with a processor.

In FIG. 5, the secondary gaming machine 20 utilizes a game processor 520. The game processor 520 is conventional in the gaming industry and may be any suitable computer that functionally performs the teachings of the present invention as described herein. The processor 520, in a well-known manner, communicates with the primary gaming machine 10 over lines 30. The details of the communication paths showing buffers, modems, data protocols, etc. is immaterial to the teachings of the present invention. The primary gaming machine 10 communicates a bonus qualifying signal over path 30 to the processor 520 and the processor 520 downloads into the primary gaming machine data such as the accumulated winnings earned by the player in the play of the bonus game in the secondary gaming machine 20. Likewise, the processor 520 receives the input signals from the player in device 500 over lines 510. The processor 520 is conventionally interconnected to the reels 55 and can randomly control spinning of those reels over lines 530 in a conventional fashion. Again, there are a number of devices and mechanisms for selectively rotating the reels 55 in a gaming machine. The processor 520 either with internal software or a random number generating device 540 randomly rotates the reels 55. The processor 520 also communicates over lines 540 with the video display 400. The video display can be of any conventional form and type. Indeed, the video display 400 may include its own multimedia or graphics processor, memory, and audio devices. The media display can be in a single location or distributed on or near the primary and secondary gaming machines 10 and 20.

In play of the game, the primary gaming machine 10 issues the bonus qualifying signal on path 30 to the processor 520. The processor 520 can either automatically spin the reels 55 or can wait for a spin signal on path 510 when the player pushes spin button 504. In the latter case, the processor 520 would activate a light to light the spin button 504 over lines 510 to inform the player to spin. It is well understood in the gaming industry that the processor 520 can also activate a media message in display 400 to inform the player to spin. Whether the processor 520 automatically spins or waits for a spin command from the player, the processor 520 selects a random number from the random number generator 540 (or in software) and directs the reels 55 to rotate and stop at the results dictated by the random number. Again, this is conventional technology in the gaming industry. With the results of the spin known to the processor 520, the processor 520 accumulates the value of any value symbols 86 on the payline 65 and displays them such as the displayed value 410 in FIG. 4. In FIG. 5, the set of value symbols 86 on payline 65 {2, −1, x3} results in determined winnings of "3" (i.e., (2−1)x3=3). In the event a lose symbol L is on the payline 65, the processor 520 causes the display to reflect this such as in FIG. 4 causing the miner 422 to move to the portion 408 currently setting forth a number of displayed lose symbols in the game (i.e., Ncurr). Hence, after the spin, the processor 520 is programmed to either automatically re-spin or wait for another spin signal on line 510 as a result of the player pushing button 504. In the latter case, the player also has the option of pushing the stop button 504 which stops the bonus game. The processor 20 upon sensing the stop signal on path 510 stops the bonus game, displays appropriate media in display 400, and downloads the accumulated winnings in award meter 75 over path 30 into the primary gaming machine 10 for credit in meter 70. It is to be expressly understood that multimedia fanfare could accompany the pushing of a stop button 502 which includes a visual graphic display in display 400 as well as accompanying audible sound effects. If the processor 520 automatically spins the reels 55, the processor 520 may wait a predetermined time (such as five seconds) to allow the player the option of pushing the stop button 502 before automatically re-spinning the reels 55. It is well known in computer technology how to provide a predetermined time period based upon the internal clock in the processor 520. In this predetermined time period, a multimedia presentation including visual graphics and sound effects could inform the player of his option to push the stop button 502 or to re-spin. The processor 520 over lines 510 would light the stop button 502 to further inform the player of his or her option to push the button 502. In one version and as previously discussed, the player may also have the right to buy lose symbols and the player could exercise that right by pushing the buy button 506 a requisite number of times. For example, if the player wishes to buy two lose symbols, and with reference back to FIG. 4 where the miner 402 occupies portion 408 corresponding to Ncurr equaling 3, the player would push the button twice. With each push, the accumulated winnings value 410 displayed in display 400 would be decremented by a fixed amount such as 20 coins (i.e., the amount of the purchase price). The opportunity to purchase lose symbols could be provided in the same predetermined time period as the stop option is provided. When the processor 520 does not automatically re-spin the reels 55, then the player would simply have a choice among the three buttons 502, 504, and 506. The use of the player input 500 provides significant player control, enjoyment, and excitement in the play of the bonus game of the present invention. The multimedia messages in display 400 can change as, for example, the miner 402 moving up the steep hill 406. All of these multimedia presentations, of course, are stored in a conventional fashion in memory associated with processor 520 or with display 400.

6. Conclusion.

The present invention teaches that the primary gaming machine 10 acts as a traditional slot machine although any suitable gaming machine can be used. A predetermined combination of symbols on a payline 60 provides a bonus qualifying signal 30 to activate an adjacent bonusing secondary gaming machine 20 as a bonus game in the preferred embodiment. The player in playing the secondary slot machine continues to accumulate winnings unless and until a "lose" symbol or a "stop" symbol, appears on payline 65. When this occurs, several embodiments provide variations as to what happens next. In a first and second embodiment, the presence of a lose symbol causes the player to lose all or a portion of the accumulated winnings. The player in some versions can issue a stop signal to stop the bonus game and not take a risk that the next spin will result in a loss. In a third embodiment, the presence of a stop symbol results in the bonus game ending with the player taking all accumulated winnings. A number of versions and modifications can occur. The operator through using negative and multiple value symbols as well as null symbols can add further excitement to the bonus game while controlling the length of the bonus game. Player anxiety occurs when negative amounts are obtained in a spin and the player may choose to issue a stop signal rather than incur further loses.

The above disclosure sets forth a number of embodiments of the present invention. Those skilled in this art will however appreciate that other arrangements or embodiments, not precisely set forth, could be practiced under the teachings of the present invention and that the scope of this invention should only be limited by the scope of the following claims.

I claim:

1. A method for playing a bonus game, the bonus game having a plurality of game symbols, said method comprising the steps of:

a. randomly displaying the plurality of game symbols in the bonus game, the plurality of game symbols at least including value symbols and end game symbols, b. determining the values in any value symbols displayed in the bonus game in response to the step of randomly displaying, c. accumulating in the bonus game the determined values to an accumulated winnings value, d. repeating in the bonus game steps a, b, and c until a predetermined number of end game symbols is reached based upon appearances of end game symbols in the bonus game, e. ending the bonus game when the predetermined number of end game symbols is reached.

2. The method of claim 1 wherein the value symbols and end game symbols are displayed on a payline in the bonus game.

3. The method of claim 1 further comprising the step of awarding an initial value in response to the bonus qualifying signal.

4. The method of claim 1 further including null symbols in the game symbols.

5. The method of claim 1 wherein the value symbols include positive integer values.

6. The method of claim 1 wherein the value symbols include negative integer values.

7. The method of claim 1 wherein the value symbols include multipliers.

8. The method of claim 1 wherein an end game symbol may appear for each displayed game symbol.

9. The method of claim 1 wherein at least one end game symbol appears as at least one of the displayed game symbols.

10. The method of claim 1 further comprising the steps of: ending the bonus game when a player stop signal is received in response to the step of accumulating, and awarding the accumulated winnings value in response to the received player stop signal.

11. The method of claim 1 further comprising the steps of: determining when the accumulated winnings value at least equals a predetermined winnings value, ending the bonus game, and awarding the accumulated winnings value.

12. The method of claim 1 further comprising the steps of determining when the accumulated winnings value equals a predetermined winnings value, ending the bonus game, and awarding a jackpot award.

13. The method of claim 1 wherein the predetermined number of end game symbols is one and the end game symbol is a stop symbol and further comprising the step of awarding the accumulated winnings in response to the step of ending the bonus game.

14. The method of claim 1 wherein the predetermined number of end game symbols is one and the end game symbol is a lose symbol.

15. The method of claim 1 further comprising the step of awarding a portion of the accumulated winnings in response to the step of ending the bonus game.

16. The method of claim 1 wherein the predetermined number of end game symbols is N and N is greater than the number of displayed game symbols on which the end game symbol appears so that the bonus game does not end with the first random display of game symbols.

17. The method of claim 16 wherein the end game symbols are lose symbols and further comprising the step of displaying in the bonus game the current value, Ncurr, where Ncurr equals the number of times a lose symbol has appeared.

18. The method of claim 17 further comprising the steps of receiving a player lose symbol purchase signal corresponding to the purchase of at least one lose symbol, decrementing the value of Ncurr by the number of purchased lose symbols, and decrementing the accumulated winnings value by a purchase value.

19. The method of claim 1 further comprising the steps of determining the predetermined number of end game symbols at the start of play of the bonus game based upon primary gaming machine results.

20. The method of claim 1 wherein at least one end game symbol may appear for each displayed game symbol and wherein the predetermined number of end game symbols is N and N is greater than one so that the bonus game does not end with the first display of game symbols in the bonus game.

21. The method of claim 1 further comprising the steps of: providing a jackpot award, setting a count value in response to the issuing of the bonus qualifying signal, adjusting the count value each time the step of randomly displaying occurs, and awarding the jackpot award when the count value equals a predetermined count value.

22. The method of claim 1 further comprising the steps of: setting a limit value in response to the issuing of the bonus qualifying signal, adjusting the limit value each time the step of randomly displaying occurs, ending the bonus game when the limit value equals a predetermined limit value, and awarding the accumulated winnings value.

23. A method for playing a bonus game, the bonus game having a plurality of game symbols, said method comprising the steps of:

a. awarding an initial value in response to the issuance of the bonus qualifying signal, b. randomly displaying the game symbols in the bonus game, the plurality of game symbols at least including value symbols, lose game symbols, and null symbols, c. determining the values in any value symbols displayed in the bonus game in response to the step of randomly displaying, d. accumulating in the bonus game the winning values to an accumulated winnings value, e. receiving any player stop signal in response to the step of accumulating, ending the bonus game when the player stop signal is received, and awarding the accumulated winnings value, f. repeating in the bonus game steps b, c, d and e until a predetermined number of lose game symbols is reached based upon appearances of the lose symbols in the bonus game, g. ending the bonus game when the predetermined number of lose game symbols is reached.

24. The method of claim 23 wherein the value symbols, null symbols and lose game symbols are displayed on a payline in the bonus game.

25. The method of claim 23 wherein the value symbols include positive integer values.

26. The method of claim 23 wherein the value symbols include negative integer values.

27. The method of claim 23 wherein the value symbols include multipliers.

28. The method of claim 23 wherein at least one lose game symbol may appear for each displayed game symbol.

29. The method of claim 23 wherein at least one lose game symbol appears as at least one of the plurality of displayed game symbols.

30. The method of claim 23 wherein the predetermined number of lose game symbols is one.

31. The method of claim 23 wherein the predetermined number of lose game symbols is N and N is greater than the number of displayed game symbols on which the end game symbol appears so that the bonus game does not end with the first random display of game symbols.

32. The method of claim 31 further comprising the step of displaying in the bonus game the current value, Ncurr, where Ncurr equals the number of times a lose symbol has appeared.

33. The method of claim 32 further comprising the steps of receiving a player lose symbol purchase signal corresponding to the purchase of at least one lose symbol, decrementing the value of Ncurr by the number of purchased lose symbols, and decrementing the accumulated winnings value by the purchase value.

34. The method of claim 33 further comprising the steps of determining the predetermined number of end game symbols at the start of play of the bonus game based upon primary gaming machine results.

35. The method of claim 23 wherein at least one lose game symbol appears as one of the plurality of displayed game symbols and wherein the predetermined number of lose game symbols is N and N is greater than one so that the bonus game does not end with the first display of game symbols in the bonus game.

36. A method for playing a bonus game, the bonus game having a plurality of game symbols, said method comprising the steps of:

a. awarding an initial value in response to the issuance of the bonus qualifying signal, b. randomly displaying the game symbols in the bonus game, the plurality of reels at least including value symbols, lose game symbols, and null symbols, c. determining the values in any value symbols displaying in the bonus game in response to the step of randomly displaying, d. accumulating in the bonus game the determined values to an accumulated winnings value, e. repeating in the bonus game steps b, c and d until a lose game symbol appears in the bonus game, f. ending the bonus game, g. awarding a portion of the accumulated winnings value.

37. The method of claim 36 wherein the value symbols, lose game symbols, and null symbols are displayed on a payline in the bonus game.

38. The method of claim 37 wherein the portion is a percentage of the accumulated winnings value.

39. The method of claim 36 wherein the value symbols include positive integer values.

40. The method of claim 36 wherein the value symbols include negative integer values.

41. The method of claim 36 wherein the value symbols include multipliers.

42. The method of claim 36 wherein at least one lose game symbol may appear for each displayed game symbol.

43. The method of claim 36 wherein at least one lose game symbol appears as at least one of the displayed game symbols.

44. A method for playing a bonus game in a, the bonus game having a plurality of game symbols, said method comprising the steps of:

a. awarding an initial value in response to the bonus qualifying signal, b. randomly displaying the game symbols in the bonus game, the plurality of game symbols having symbols chosen from a set of symbols consisting essentially of: negative value symbols, positive value symbols, multiplier symbols, null symbols, and lose symbols, c. determining the values in any value symbols displayed in the bonus game in response to the step of randomly displaying, d. accumulating in the bonus game the determined values to an accumulated winnings value, e. receiving any player stop signal in response to the step of accumulating, said step of receiving further comprising the steps of:

i. ending the bonus game when the player stop signal is received, ii. awarding the accumulated winnings value, f. repeating in the bonus game steps b, c, d and e until a predetermined number N of lose game symbols is reached based upon appearances of lose game symbols in the bonus game wherein N is of sufficient value that the bonus game does not end with the first random display of game symbols, g. ending the bonus game when the predetermined number N of lose game symbols is reached.

45. The method of claim 44 wherein the game symbols are displayed on a payline in the bonus game.

46. The method of claim 44 wherein the predetermined number is randomly selected in a range upon issuance of the bonus qualifying signal.

* * * * *